(12) United States Patent
Sa

(10) Patent No.: US 8,183,825 B2
(45) Date of Patent: May 22, 2012

(54) DOCKING CHARGER FOR CHARGING A HAND HELD ELECTRONIC DEVICE WITH OR WITHOUT A PROTECTIVE COVER CASE FITTED THEREON

(76) Inventor: Shuang Sa, Richmond (CA)

(*) Notice: Subject to any disclaimer, the term of this patent is extended or adjusted under 35 U.S.C. 154(b) by 369 days.

(21) Appl. No.: 12/430,518

(22) Filed: Apr. 27, 2009

(65) Prior Publication Data

US 2010/0102777 A1   Apr. 29, 2010

Related U.S. Application Data

(60) Provisional application No. 61/109,423, filed on Oct. 29, 2008.

(51) Int. Cl.
*H02J 7/00* (2006.01)
(52) U.S. Cl. ......... 320/107; 320/112; 320/114; 320/115
(58) Field of Classification Search .................. 320/107, 320/112, 114, 115
See application file for complete search history.

(56) References Cited

U.S. PATENT DOCUMENTS

| | | | |
|---|---|---|---|
| 4,558,270 A | 12/1985 | Liautaud et al. | |
| 5,233,281 A | 8/1993 | Chiang et al. | |
| 5,280,229 A | 1/1994 | Faude et al. | |
| D358,579 S | 5/1995 | Richards et al. | |
| D362,227 S | 9/1995 | Richards et al. | |
| 5,742,149 A | 4/1998 | Simpson | |
| 6,040,681 A | 3/2000 | May | |
| D427,970 S | 7/2000 | Sage | |
| 6,764,788 B2 | 7/2004 | Robertson, Jr. et al. | |
| 7,145,603 B2 | 12/2006 | Whitby et al. | |
| 7,365,514 B2 | 4/2008 | Tong | |
| D568,297 S | 5/2008 | Andre et al. | |
| 7,480,138 B2 | 1/2009 | Kogan et al. | |
| 2004/0204056 A1 | 10/2004 | Phelps, III | |
| 2007/0002533 A1* | 1/2007 | Kogan et al. | 361/686 |
| 2007/0047198 A1 | 3/2007 | Crooijmans et al. | |
| 2008/0164845 A1 | 7/2008 | Choi | |
| 2009/0309543 A1* | 12/2009 | Shen | 320/115 |

* cited by examiner

*Primary Examiner* — Samuel Berhanu
(74) *Attorney, Agent, or Firm* — Cozen O'Connor

(57) ABSTRACT

The embodiments relate generally to a docking charger for charging a hand held electronic device. The docking charger has a docking base formed with a reception area. The reception area has a shape and size to support and hold the hand held electronic device in a charging position when the protective cover case is fitted on the hand held electronic device. The docking charger also has a charger adapter formed to be removably fitted in the reception area of the docking base. The charger adapter has an interior chamber shaped and sized to directly support and hold the hand held electronic device in the charging position when the protective cover case is removed from the hand held electronic device. The docking charger has two working positions. In the first working position where the charger adapter is removed from the reception area of the docking base, the reception area is exposed to receive the hand held electronic device fitted with its protective cover case. In the second working position, the charger adapter is fitted inside the reception area of the docking base to directly receive the hand held electronic device free of its protective cover case.

34 Claims, 13 Drawing Sheets

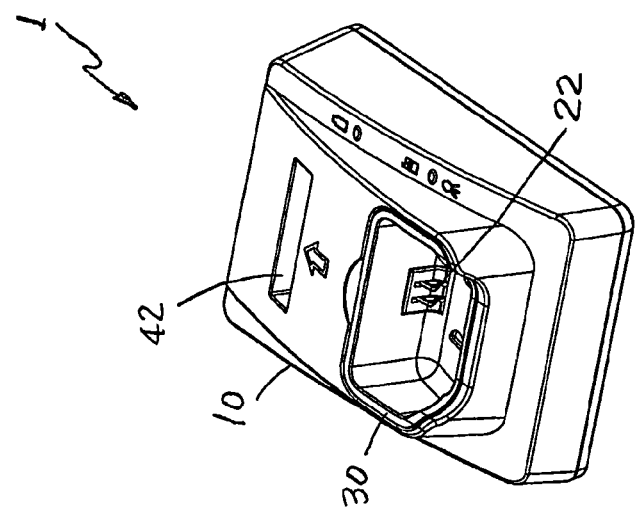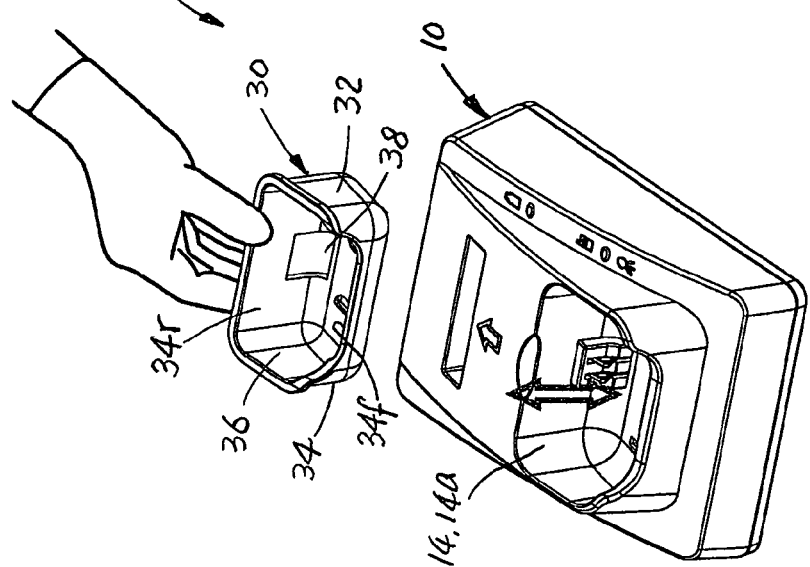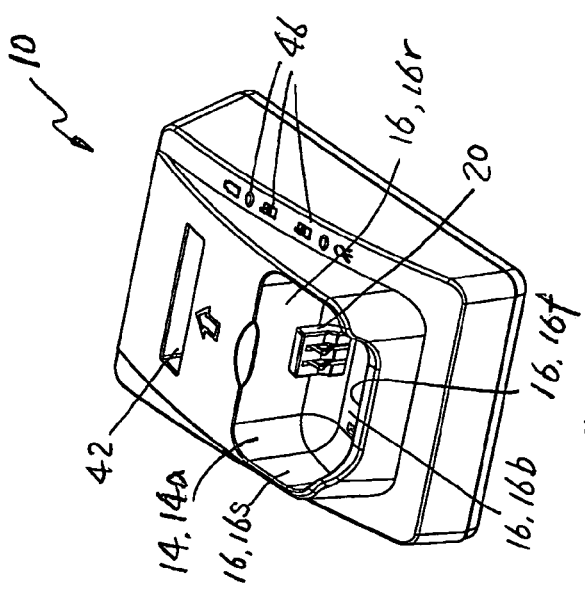

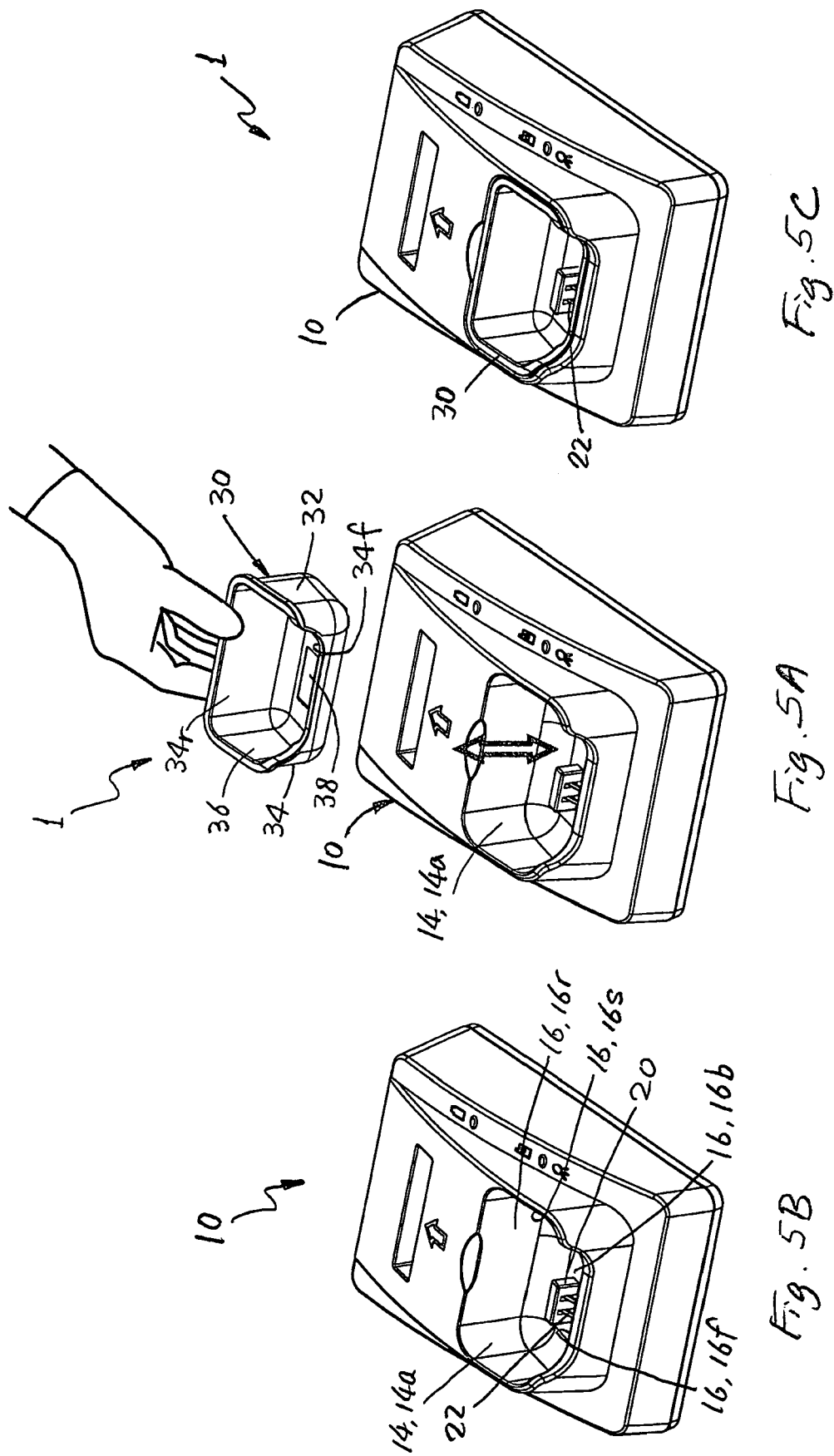

DOCKING CHARGER FOR CHARGING A HAND HELD ELECTRONIC DEVICE WITH OR WITHOUT A PROTECTIVE COVER CASE FITTED THEREON

CROSS-REFERENCE TO RELATED APPLICATION

This patent application claims priority from U.S. Provisional Patent Application No. 61/109,423 filed Oct. 29, 2008.

BACKGROUND OF THE INVENTION

1. Field of the Invention

The present invention relates generally to a docking charger for a hand held electronic device. More specifically, the invention relates to a docking charger configured to accommodate a hand held electronic device with and without its protective cover case fitted thereon. The invention also relates to a removable charger adapter for use in a base of a docking charger to allow a user to charge a hand held electronic device with and without its protective cover case fitted thereon.

2. Description of the Related Art

Various docking chargers have been used for charging hand held electronic devices. Typically, a hand held electronic device is directly received in a docking charger during the charging operation with the battery remaining in the hand held electronic device. For example, the docking charger can be formed with a recess, which is adapted to have a particular shape and size to accommodate a portion of the hand held electronic device to be charged.

Hand held electronic devices are typically used with a cover case for either protecting or decorating the hand held electronic device during its normal use. When charging such a hand held electronic device, a user often has to remove the cover case before placing the hand held electronic device inside the docking charger for charging the battery. After the charging operation is completed, the user then has to fit the cover case back onto the hand held electronic device. Such additional steps of removing and refitting the cover case cause inconvenience to the user each time when the hand held electronic device is to be charged.

In addition, existing docking chargers are formed for charging a particular type and model of hand held electronic device. When different types or models of hand held electronic devices are to be charged, multiple desktop chargers are to be provided, which can create a chaotic desktop arrangement.

The following description provides a docking charger that addresses the above mentioned inconvenience and simplifies the battery charging operation of various hand held electronic devices.

SUMMARY OF THE INVENTION

The embodiments disclosed herein relate generally to a docking charger for any of various hand held electronic devices. The docking charger has a docking base formed with a reception area. The reception area has a predetermined shape and size to support and hold the hand held electronic device in a charging position when the protective cover case is fitted on the electronic device. The docking charger also has a charger adapter formed to be removably fitted in the reception area of the docking base. The charger adapter has an interior chamber shaped and sized to directly support and hold the hand held electronic device in the charging position when the protective cover case is removed from the electronic device.

The docking charger has two working positions. In the first working position, at least part of the charger adapter is removed from the reception area of the docking base. In such a case, the hand held electronic device together with its protective cover case can be received in the reception area without the need to first remove the protective cover case from the hand held electronic device. When different portions of the charger adapter are removed from the reception area of the docking base, the remaining portion of the charger adapter can accommodate and support the hand held electronic device with various protective cover cases of different thickness. In the second working position, the charger adapter is fitted inside the reception area of the docking base and directly receives and supports the hand held electronic device free of any protective cover case.

The embodiments also relate to a removable charger adapter for use in a docking charger during battery charging operation of a hand held electronic device.

BRIEF DESCRIPTION OF THE DRAWINGS

The following description is set forth in connection with the attached drawing figures, which are not necessarily to scale, emphasis instead generally being placed upon illustrating the principles of the invention. In the drawing figures:

FIG. 1A is an exploded perspective view of a docking charger formed according to a first embodiment;

FIG. 1B shows the FIG. 1A docking charger in a first working position;

FIG. 1C shows the FIG. 1A docking charger in a second working position;

FIGS. 5A to 5C are perspective views of a docking charger formed according to a second embodiment;

DETAILED DESCRIPTION OF THE EMBODIMENTS

Figure 1D:
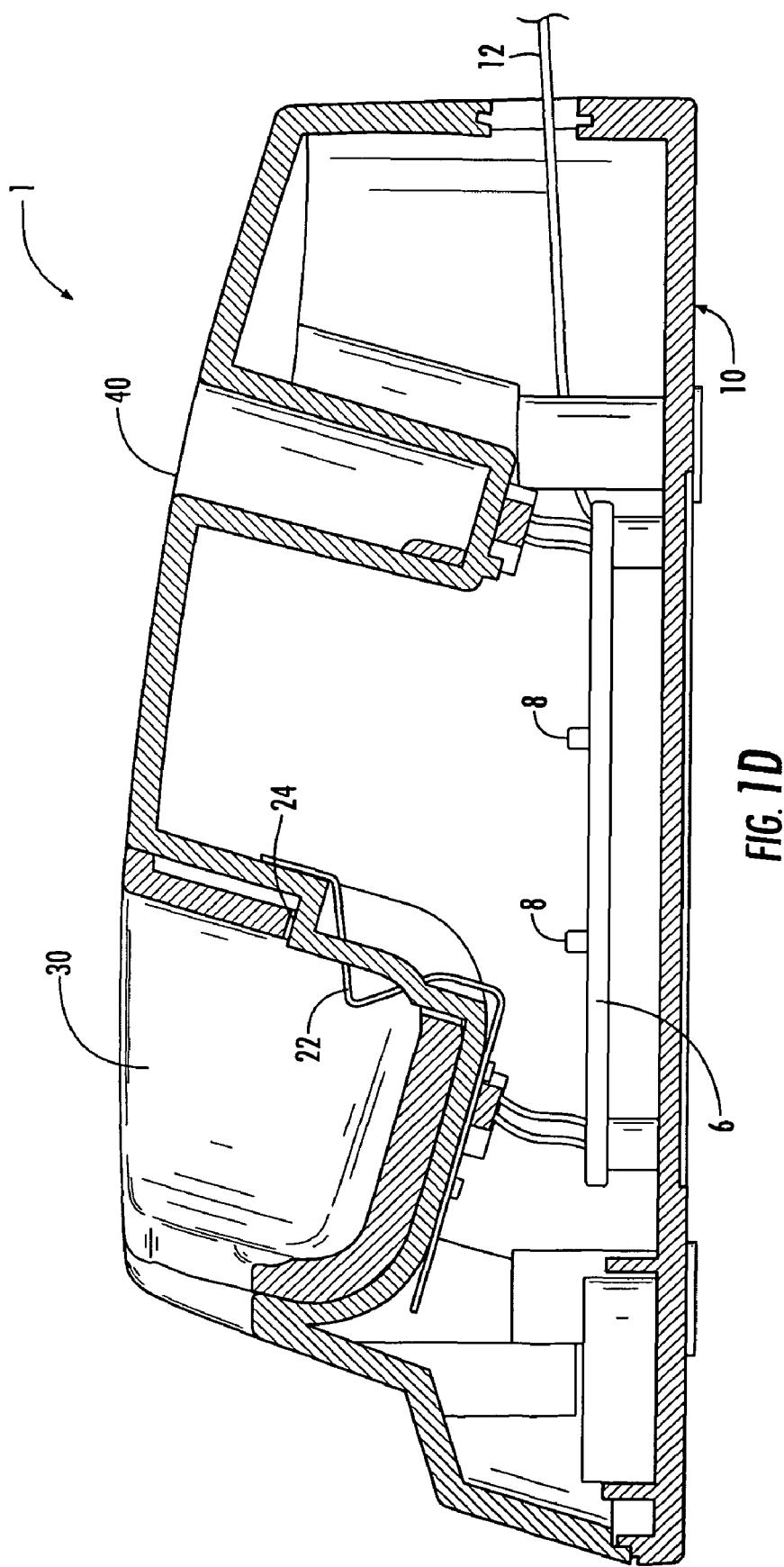
FIG. 1D is a longitudinal cross-sectional view of the FIG. 1A docking charger.

The various docking chargers 1 described herein are formed to charge batteries when they remain in the hand held electronic devices 2. Although the docking chargers 1 in the various drawing figures are shown as desktop chargers, the docking chargers 1 described herein are not so limited and can be formed as wall chargers, car chargers, and built-in dashboard chargers. In addition, although mobile phones are shown in the various drawing figures as examples of the hand held electronic devices 2, the various embodiments are not limited to use with such mobile phones. The docking chargers 1 described herein can be configured to charge any of various hand held electronic devices 2, such as cell phones with or without operating systems, personal data assistants, portable video games, MP3 players, digital cameras, video cameras, voice recorders, portable global positioning systems, or other portable electronic devices that include rechargeable batteries.

FIGS. 1A to 1D show a first embodiment of a docking charger 1 for charging any of various hand held electronic devices 2 as described above. The docking charger 1 can include a docking base 10, which can be configured to be connected to any of various power sources, such as a standard AC outlet, automobile 12V supply, or a low voltage 5V supply. Various connectors, such as a power cord 12, can be used to connect the docking base 10 to a power source. For example, the power cord 12 can have a USB terminal for connecting to a USB port formed a power adapter device.

Additionally or alternatively, the docking base 10 can be configured to connect to a computer device, such as by a USB cable, for data transfer.

The docking base 10 has a reception area 14 formed to accommodate a hand held electronic device 2 during the battery charging operation as is described in details below. In one embodiment shown in FIGS. 1A and 1B, the reception area 14 is formed by surrounding walls 16 including a front wall 16f, a rear wall 16r, and side walls 16s. The reception area 14 in the docking base 10 is formed to have sufficient volume to accommodate a hand held electronic device 2 fitted with a protective cover case 4 (see, FIGS. 2A and 2B). For example, the reception area 14 can be formed in various shapes and sizes to accommodate a portion (such as a lower or side portion) of the combined hand held electronic device 2 and protective cover case 4. In such a case, the user can charge the hand held electronic device 2 without removing its protective cover case 4, thereby simplifying the battery charging operation.

Additionally or alternatively, the reception area 14 in the docking base 10 can be formed to provide at least partial support of the combined hand held electronic device 2 and protective cover case 4 during the charging operation. For example, at least part of the reception area 14 can have a shape and/or size complement to a lower portion of the protective cover case 4 after it is fitted on the hand held electronic device 2. In such a case, after the combined hand held electronic device 2 and protective cover case 4 is placed in the reception area 14, at least a portion of the protective cover case 4 is in contact with the surrounding walls 16 of the reception area 14 and thus supported thereby. In the example shown in FIGS. 2A and 2B, the combined hand held electronic device 2 and protective cover case 4 leans backwards on the rear wall 16r of the reception area 14 and is supported thereby.

In one embodiment shown in FIGS. 1A and 1B, the reception area 14 is in the form of a receiving chamber 14a. One or more of the surrounding walls 16 can be formed to be in contact with the protective cover case 4 fitted on the hand held electronic device 2, when the combined hand held electronic device 2 and protective cover case 4 is placed in the receiving chamber 14a. For example, the rear wall 16r of the receiving chamber 14a is so formed that such rear wall 16r at least partially contacts and supports the lower back portion of the combined hand held electronic device 2 and protective cover case 4 during the battery charging operation. Additionally or alternative, the front wall 16f of the receiving chamber 14a can be positioned to contact the lower front portion of the combined hand held electronic device 2 and protective cover case 4, thereby biasing against such lower front portion and prevent the hand held electronic device 2 from flipping over during the battery charging operation. The reception area 14 can be formed in any of various other forms, such as described below in connection with one or more additional embodiments.

To facilitate the charging operation, the docking charger 1 is formed with a charging connector 20 for connecting to a charging port (not shown) formed in a hand held electronic device 2. As is shown in FIGS. 1A to 1D, the charging connector 20 extends away from the surrounding wall 16 and into the reception area 14 for a predetermined length. The charging connector 20 can have a contact portion 22, which is electronically connected with a corresponding electrical contact in the charging port of a hand held electronic device 2 during a charging operation. The contact portion 22 of the charging connector 20 can be formed on a portion of the charging connector 20, as is shown in FIGS. 1A to 1C. Additionally or alternatively, the contact portion 22 of the charging connector 20 can be formed on the entire length of the charging connector 20.

The contact portion 22 can be configured in various forms. For example, the contact portion 22 can be configured to mate with a standard USB type charging port on mobile phones. As one skilled in the art will appreciate, the contact portion 22 can be formed in various other manners to be compatible with electrical contact of the charging port on the hand held electronic device 2 to be charged.

In addition, the contact portion 22 is electrically connected to the power cord 12 to be connected to an external power source. FIG. 1D shows an electrical circuit board 6 with various components 8 (such as LED's), which are built in the docking base 10, for supplying power to the contact portion 22. Although exemplary circuit and components are shown, any known or hereafter developed electrical circuits and components formed in various other ways for the same purpose may alternatively or additionally be used.

During the battery charging operation, the contact portion 22 of the charging connector 20 extends into the charging port on the hand held device 2, while the remaining portion of the charging connector 20 remains outside the hand held device 2. For example, in the first working position, the remaining portion of the charging connector 20 lies in an access opening 4a of the protective cover case 4. In the second working position, the remaining portion of the charging connector 20 lies in an access opening 38 of the charger adapter 30, as illustrated in FIGS. 1A, 1C, and 1D.

In one embodiment, a base portion 24 is provided to support the contact portion 22. As is shown in FIGS. 1A, 1B, and 1D, the base portion 24 protrudes into the reception area 14 from the surrounding walls 16 of the reception area 14. In the example shown in FIGS. 1A and 1B, the base portion 24 of the charging connector 20 projects from the rear wall 16r of the reception area 14 for a predetermined thickness. In one example, the thickness of the base portion 24 can be determined to be substantially the same as the thickness of the charger adapter 30. In such as example, the base portion 24 and the charger adapter 30 can form a smooth transition therebetween when the charger adapter 30 is fitted inside the reception area 14.

In another example, the thickness of the base portion 24 can be determined according to the thickness of the protective cover case 4 of the hand held electronic device 2 to be charged. In one example, the thickness of the base portion 24 can be determined to allow charging a hand held electronic device 2 without removing its protective cover case 4. For example, the thickness of the base portion 24 is at least the same as the thickness of the cover case 4 of the hand held electronic device 2. In such a case, when the combined hand held electronic device 2 and protective cover case 4 is placed in the reception area 14, the base portion 24 can extend through the access opening 4a (see, FIG. 3) in the cover case 4 so that the contact portion 22 can reach the electrical contact in the charging port of the hand held electronic device 2. For example, the base portion 24 can have a thickness from about 1 mm to about 10 mm, and preferably 5 mm.

Additionally or alternatively, the base portion 24 can be formed to have a shape complementary to the access opening 4a in the cover case 4. When the combined hand held electronic device 2 and protective cover case 4 is placed in the reception area 14, the access opening 4a in the cover case 4 can fit around the base portion 24 to position and support the hand held electronic device 2 inside the docking base 10.

The charging connector 20 can be formed at any of various locations inside the reception area 14 of the docking base 10, depending on the position of the charging port on the hand held electronic device 2 to be charged. In the embodiment shown in FIGS. 1A and 1B, the charging connector 20 is formed on the rear wall 16r of the receiving chamber 14a, to connect with the charging port formed at the lower back portion of the hand held electronic device 2. The charging connector 20 can be formed at other locations on the rear wall 16r of the receiving chamber 14a. For example, the charging connector 20 can be positioned at either a central location or an off center location in relation to the left and right side walls 16s of the receiving chamber 14a, as will be described below in connection with additional embodiments.

Figure 2A:
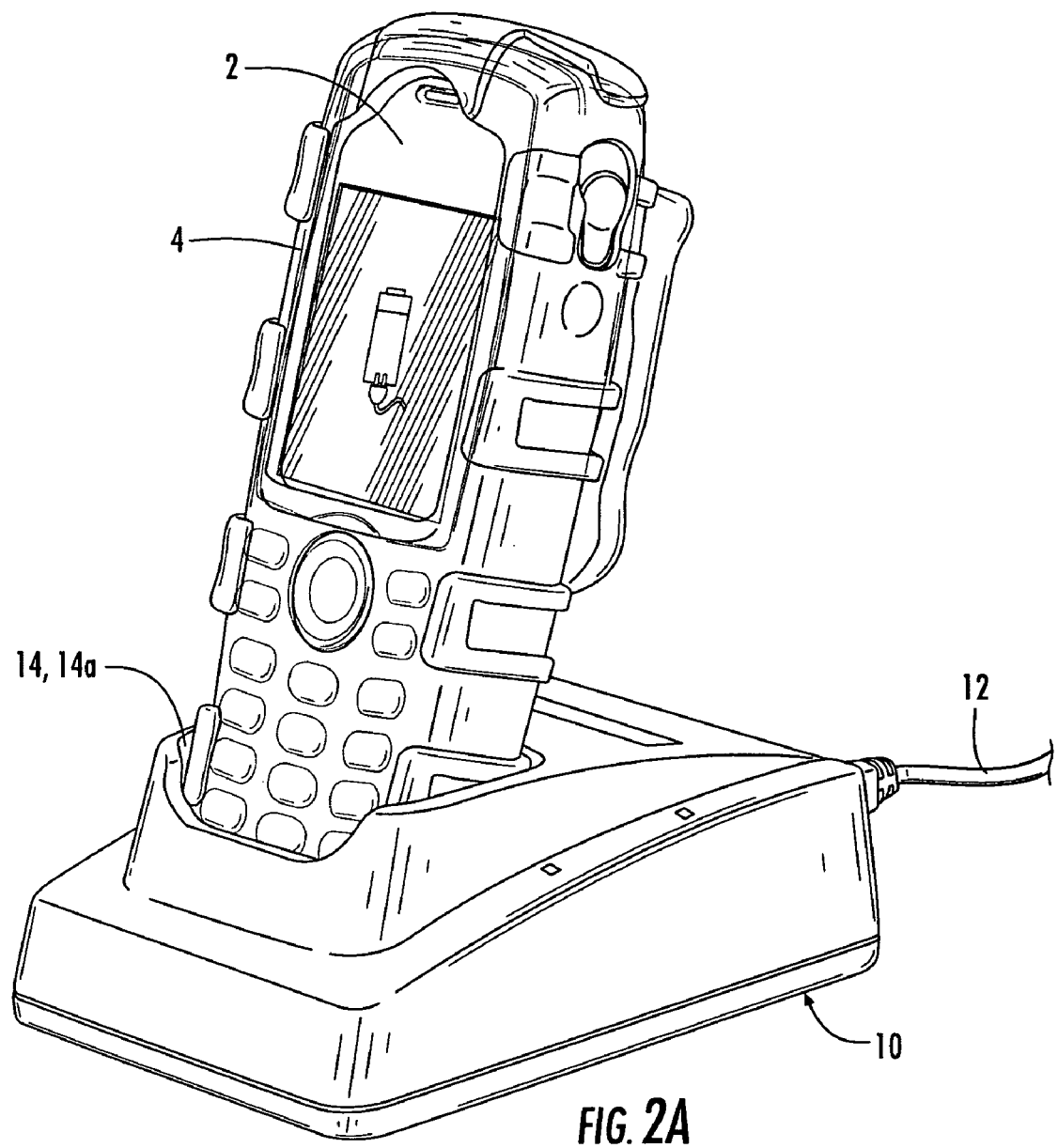
FIG. 2A shows the docking charger being used to charge a hand held electronic device fitted with a cover case.
Figure 2B:
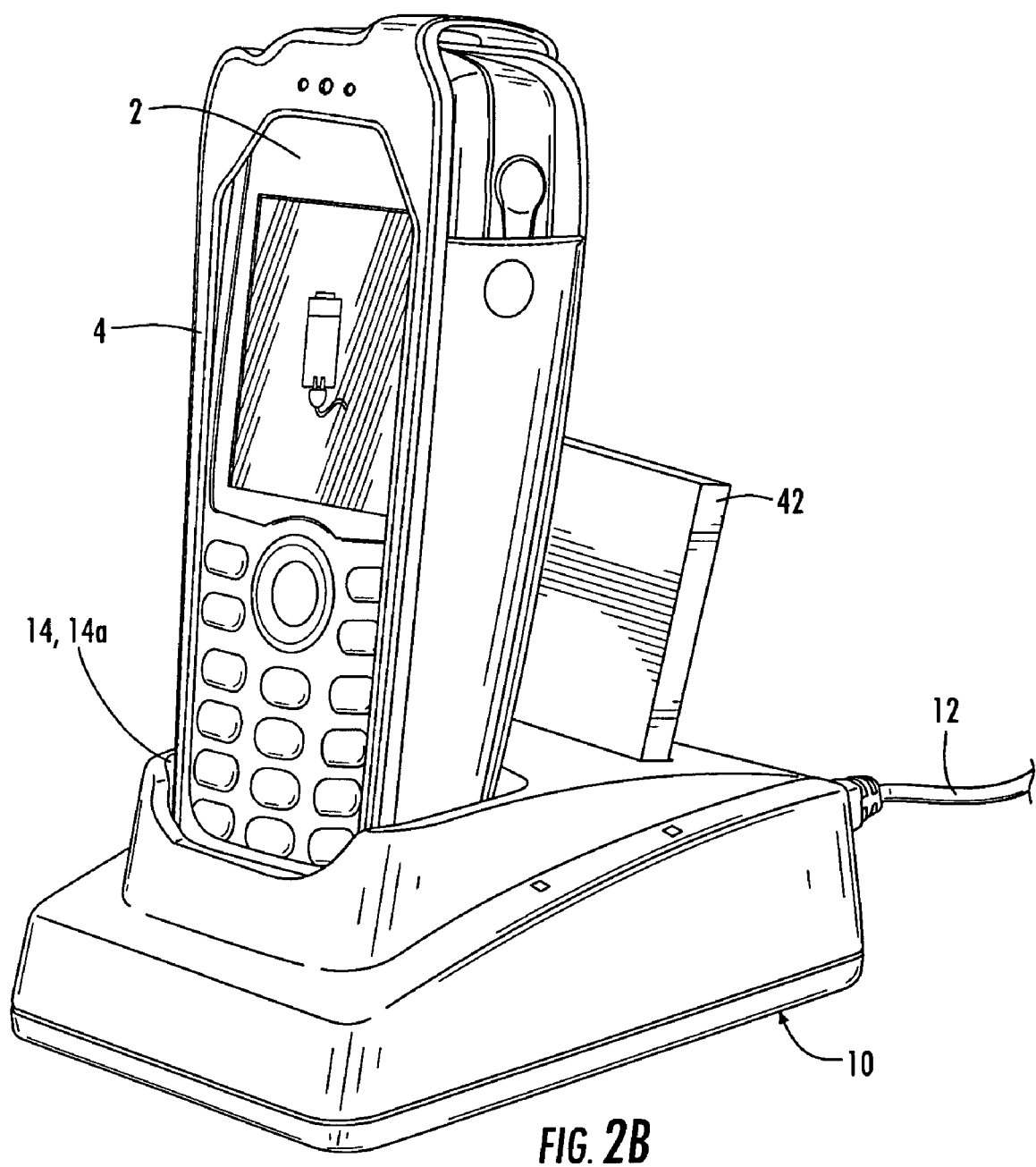
FIG. 2B shows the docking charger being used to charge a hand held electronic device with a different type of cover case from that shown in FIG. 2B and a battery.

FIG. 1B shows the docking charger 1 at a first working position, where the docking charger 1 can receive a hand held electronic device 2 fitted with its protective cover case 4. The user thus can charge the hand held electronic device 2 without first removing the cover case 4, as illustrated in FIGS. 2A and 2B.

Figure 3:
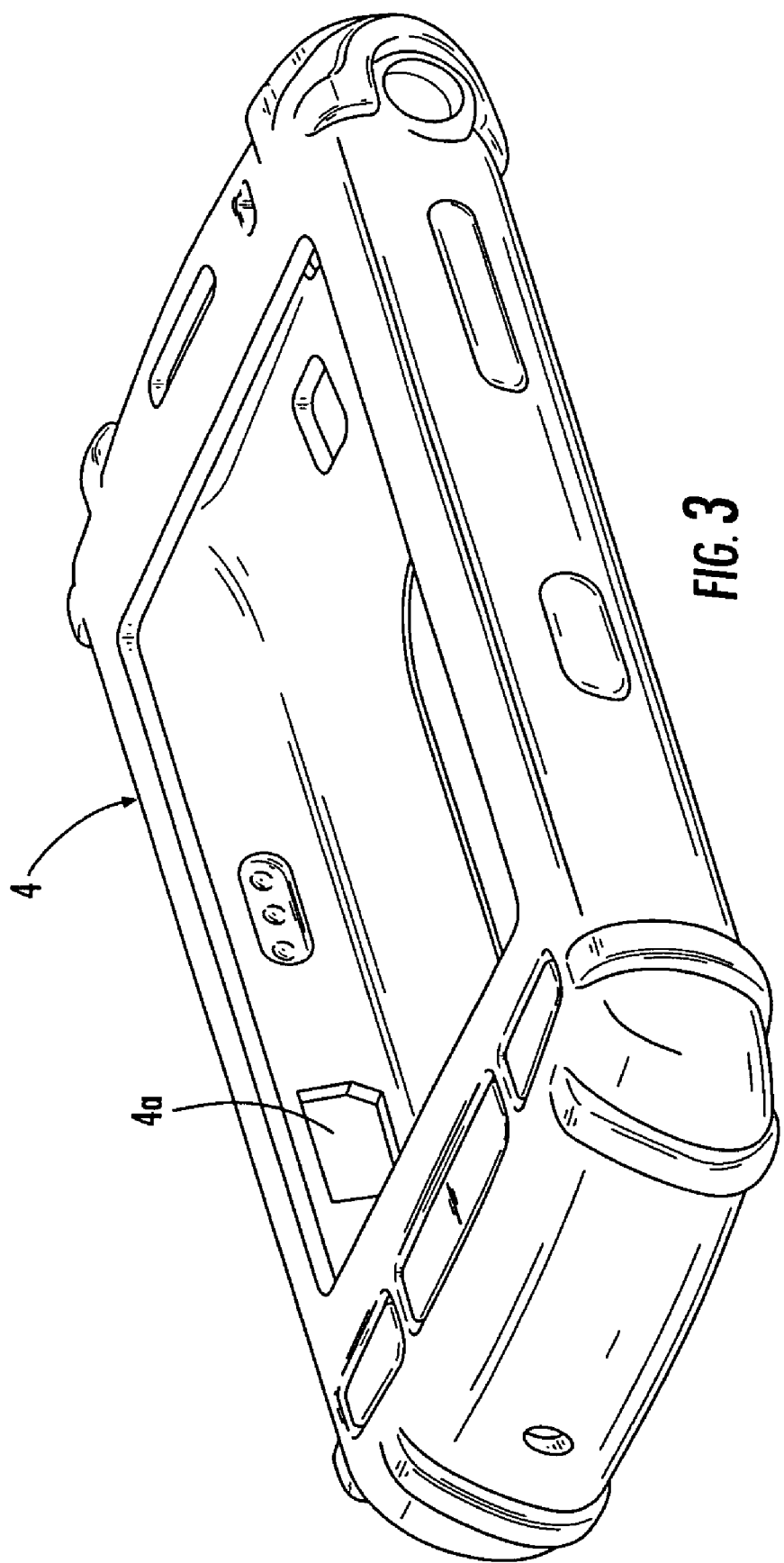
FIG. 3 is a perspective view of a cover case for a hand held electronic device.

As is shown in FIG. 3, the protective cover case 4 can be formed in various shapes and/or sizes for protecting the integrity or enhancing the appeal of the hand held electronic device 2. For example, the protective cover case 4 can be removably fitted onto the hand held electronic device 2 covering a portion of the hand held electronic device 2 for protection purposes and at the same time revealing its display screen and/or key pad for viewing and data entry purposes. The protective cover case 4 can be made of any of various materials, including but not limited to, plastic, silicone, rubber, or fabric materials.

Additionally or alternatively, the protective cover case 4 can have a range of thickness depending on various factors, such as the use environment of the hand held electronic device 2 and the user's preference. For example, the thickness of the cover case 4 can range from about 2 mm to about 3 mm. In one example, the thickness of the cover case 4 can be from about 5 mm to about 6 mm for enhanced protection of the hand held electronic device 2, such as for example for use at a construction site or other areas in which the hand held electronic device 2 is exposed to harsh weather or rough handling conditions. In another example, the thickness of the cover case 4 can be about 1 mm to result in a slim and compact hand held electronic device 2 protected by a cover case 4.

In the embodiment shown in FIGS. 1A and 1C, the docking charger 1 is shown to include a charger adapter 30, which is configured to be removably fitted inside the reception area 14 of the docking base 10 (see, arrow in FIG. 1A). For example, the exterior surface 32 of the charger adapter 30 is formed to be snugly fitted with the surrounding walls 16 of the reception area 14. In one embodiment, the charger adapter 30 can have a cup shape defined by surrounding walls 34 and a bottom wall 34b. As is described below in connection with additional embodiment, the charger adapter 30 can also be formed of various other shapes.

The interior chamber 36 of the charger adapter 30 can be configured to receive and support the hand held electronic device 2 during the charging operation. In the example shown in FIGS. 4A and 4B, the interior chamber 36 can receive the lower portion of the same hand held electronic device 2 discussed above but without the cover case 4. In another example, the interior chamber 36 of the charger adapter 30 can receive a smaller hand held electronic device together with its cover case. In a further example as will described in greater detail below, the interior chamber 36 of the charger adapter 30 can receive the hand held electronic device 2 with a different cover case 4 of a reduced thickness.

The charger adapter 30 can provide at least partial support to the hand held electronic device 2 after the hand held electronic device 2 is placed in the interior chamber 36. In the example shown in FIGS. 4A and 4B, the charger adapter 30 at least partially support the lower portion of the hand held electronic device 2 when the hand held electronic device 2 leans on the rear wall 34r of the charger adapter 30. Additionally or alternatively, the front wall 34r of the charger adapter 30 can be formed to contact the lower front portion of the hand held electronic device 2 placed in the interior chamber 36. In such a case, the front wall 34r of the charger adapter 30 can bias against such lower front portion of the hand held electronic device 2 and prevent the same from flipping over during the battery charging operation. The charger adapter 30 can be formed in various other forms, such as described in the following embodiments.

The charger adapter 30 is formed with an access opening 38 allowing the contact portion 22 of the charging connector 20 to pass through when the charger adapter 30 is assembled with the docking base 10. In one example, the access opening 38 is formed in the rear wall 34r of the charger adapter 30. Depending on the location of the charging connector 20 on a surrounding wall 16 of the reception area 14, the access opening 38 in the charger adapter 30 can be centrally located or otherwise off set from the center. When such a charger adapter 30 is placed in the reception area 14 of the docking base 10, as is shown in FIG. 1C, the contact portion 22 of the charging connector 20 protrudes into the interior chamber 36 of the charger adapter 30 through its access opening 38. The contact portion 22 located inside the interior chamber 36 can be aligned with and connected to the charging port of the hand held electronic device 2.

Additionally or alternatively, the size of the access opening 38 in the charger adapter 30 can be determined to fit around the base portion 24 of the charging connector 20 when the charger adapter 30 is assembled with the docking base 10, as is shown in FIGS. 1C and 1D. In one example, the access opening 38 and the base portion 24 can be formed to have the same shape and size so that no space is left between the base portion 24 and the adjacent surrounding wall 34 of the charger adapter 30 when the charger adapter 30 is assembled with the docking base 10 as is partially shown in FIG. 1D. In such a case, the access opening 38 in the charger adapter 30 and the base portion 24 of the charging connector 20 cooperate with each other to position the charger adapter 30 inside the reception area 14 and maintain the charger adapter 30 in position.

Figure 4A:
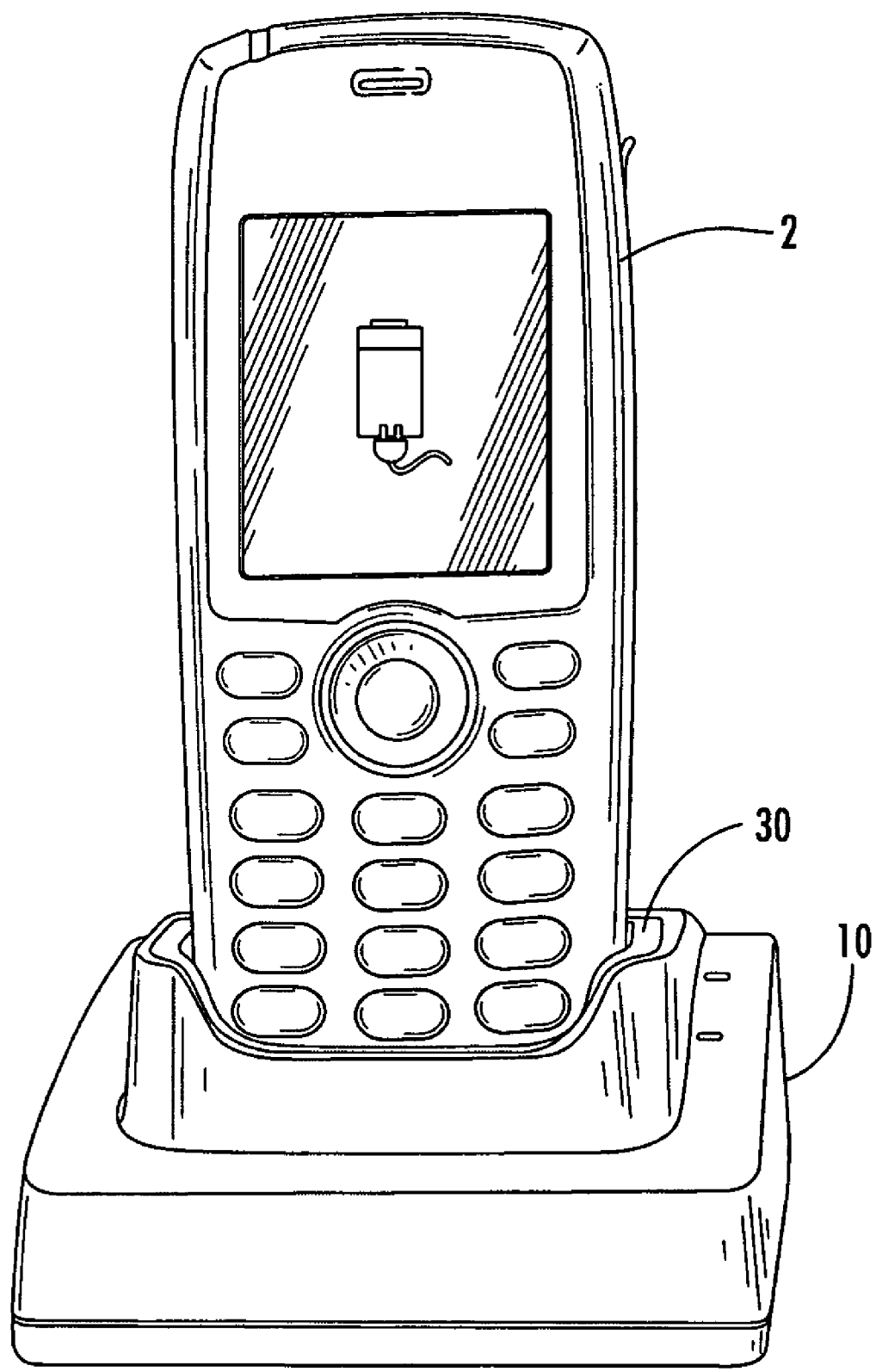
FIG. 4A shows a docking charger being used to charge a hand held electronic device without its cover case.
Figure 4B:
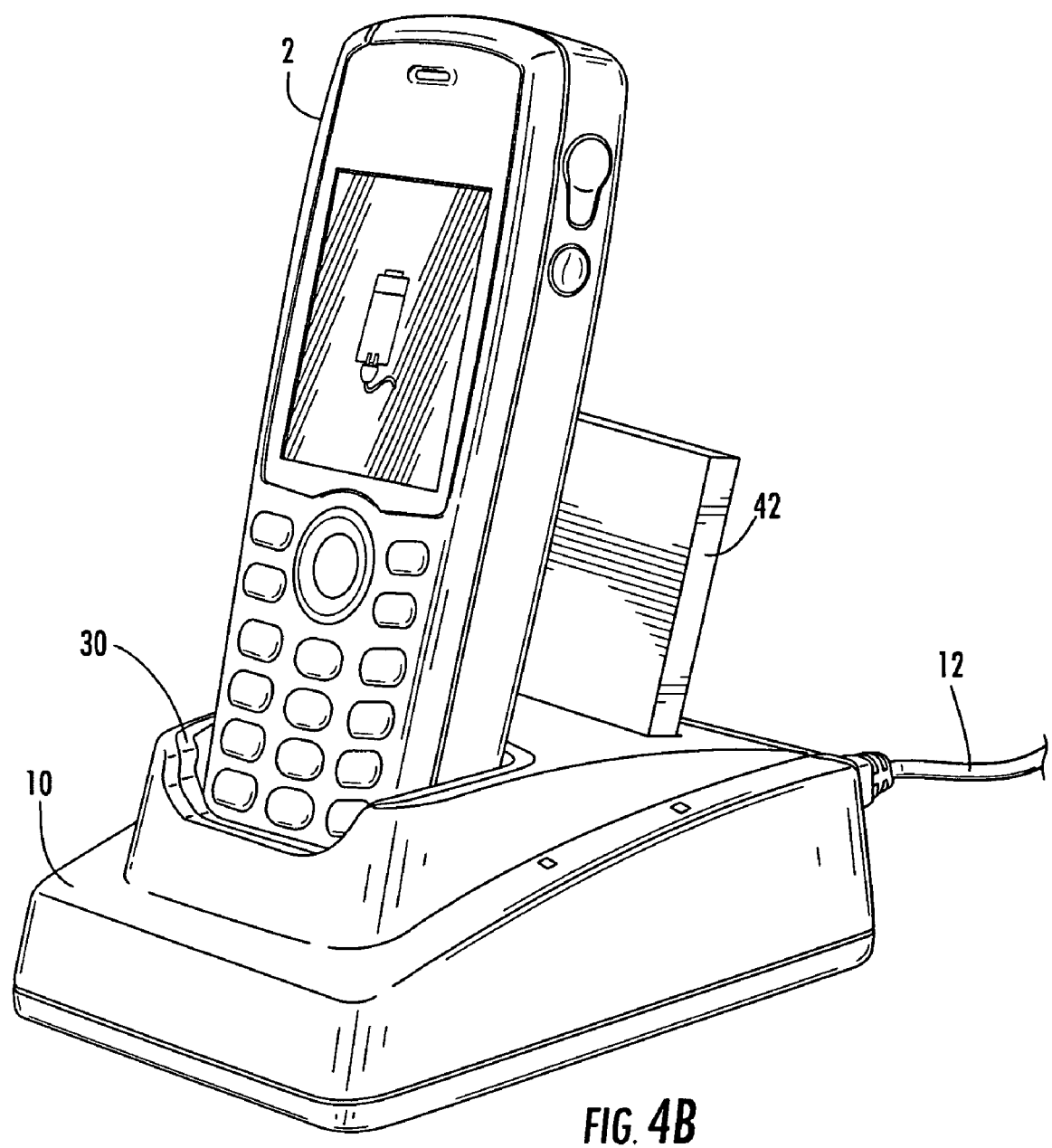
FIG. 4B shows the docking charger being used to charge both a hand held electronic device as shown in FIG. 4A and a battery.

FIG. 1C shows the docking charger 1 at a second working position, where the docking charger 1 can receive a hand held electronic device 2 without the protective cover case 4. As is shown in FIGS. 4A and 4B, the hand held electronic device 2 can be directly held in the charger adapter 30 after the cover case 4 is being removed from the hand held electronic device 2. In this embodiment, the charger adapter 30 takes up the space occupied by the cover case 4 in the first working position, when the combined hand held electronic device 2 and protective cover case 4 are fitted inside the reception area 14. For example, the surrounding walls 34 of the charging adapter 30 can be formed to have the same shape and/or thickness as that of the lower portion of the protective cover case 4.

The charger adapter 30 can be formed to have any of various appropriate thicknesses. For example, the surrounding walls 34 of the charger adapter 30 can have a thickness corresponding to that of the protective cover case 4 used with the hand held electronic device 2. In one example, the surrounding walls 34 of the charger adapter 30 and the lower portion of the protective cover case 4 can be formed similarly to each other. In another example, the surrounding walls 34 and the lower portion of the protective cover case 4 can be formed to have substantially the same thickness or otherwise be interchangeable inside the reception area 14 to support the hand held electronic device 2 in the battery charging operation.

Additionally or alternatively, the surrounding walls 34 of the charger adapter 30 can be formed to have other appropriate thickness. In one example best shown in FIGS. 1C and 1D, the rear wall 34r of the charger adapter 30 has the same thickness as that of the base portion 24 of the charging connector 20. Accordingly, the rear wall 34r and the base portion 24 can form a substantially smooth surface after the charger adapter 30 is fitted inside the reception area 14. In one example, the rear wall 34r of the charger adapter 30 can have a thickness of about 5 mm. In another example, the surrounding walls 34 of the charger adapter 30 can have a uniform thickness.

In another example, the side walls 34s of the charger adapter 30 can have a varying thickness to accommodate hand held electronic devices 2 with off center charging ports. For example, the charging adapter 30 can have one side wall 34s thicker than the other side wall 34s. When such a charger adapter 30 is used with a docking base 10 having a centrally positioned charging connector 20, the contact portion 22 entering in the interior chamber 36 is offset by the varying side walls 34s. For example, the contact portion 22 is closer to one of the side walls 34s of the charger adapter 30. Such off center contact portion 22 inside the charger adapter 30 can be aligned with and connected to an offset charging port of a hand held electronic device. The charging adapter 30 so formed can thus receive and support a hand held electronic device with a charging port offset toward one side.

Additionally or alternative, the charger adapter 30 can have one of its front and rear walls 34f, 34r thicker than the other. The charger adapter 30 so formed can receive and support a hand held electronic device with a charging port offset toward either the front or the back side.

Optionally, the docking base 10 can be formed with additional components associated with a battery charging operation. As FIGS. 1A to 1C show, the docking base 10 can also contain a battery charging slot 40 for charging a stand-alone battery 42, either separately from or together with the hand held electronic device 2. The battery charging slot 40 is formed to allow electrical connection between the battery 42 and an appropriate charging circuit, such as the electric circuit board 6 shown in FIG. 1D. One or more switch 44 can be provided on the docking base 10 for manual control of a battery charging process. In addition, the docketing device 10 can contain various indicators 46 to notify the user of the status of the battery charging process.

The operation of the docking charger 1 will be described below.

The docking charger 1 can be used at different working positions. For example, the removable charger adapter 30 allows the docking charger 1 to charge the hand held electronic device 2 with or without its cover case 4. In the examples shown in FIGS. 2A and 2B, the entire charger adapter 30 is removed from the reception area 14 of the docking base 10. In such a case, the hand held electronic device 2 is fitted directly in the reception area 14 of the docking base 10 with the protective cover case 4 still remain on the hand held electronic device 2. The user can thus charge the hand held electronic device 2 without removing the cover case 4.

In the examples shown in FIGS. 4A and 4B, the charger adapter 30 is fitted inside the reception area 14 of the docking base 10. A hand held electronic device 2 is placed in the charger adapter 30 after the protective cover case 4 is removed from the hand held electronic device 2. At least a portion of the front, rear, and side walls 34f, 34r, 34s of the charger adapter 30 supports the hand held electronic device 2 in a charging position during the charging process. For example, the hand held electronic device 2 can be positioned to partially lean against the rear wall 34r of the charger adapter 30, as is shown in FIG. 4B.

Accordingly, the charger adapter 30 and the reception area 14 are sized so that the hand held electronic device 2 by itself is held in the reception area 14 with the charger adapter 30, while the hand held electronic device 2 fitted with its protective cover case 4 is held in the reception area 14 without the charger adapter 30.

FIGS. 5A to 5D show a second embodiment of the docking charger 1, in which the charging connector 20 is formed on the bottom of the reception area 14. The charging connector 20 can extend or otherwise be elevated from the bottom 16b of the receiving chamber 14a. Additionally or alternatively, the base portion 24 is formed to have a height measured from the bottom 16b of the reception area 14. The height of the base portion 24 is so provided to elevate the contact portions 22 so that they are spaced from the bottom of the reception area 14 for a predetermined distance. In one example, such distance is at least the same as the thickness of the cover case 4 of the hand held electronic device 2. The base portion 24 so formed can fill the gap between the charging connector 20 and the cover case 4 and thus assist in positioning the hand held electronic device 2 in place during the battery charging operation.

Figure 5D:
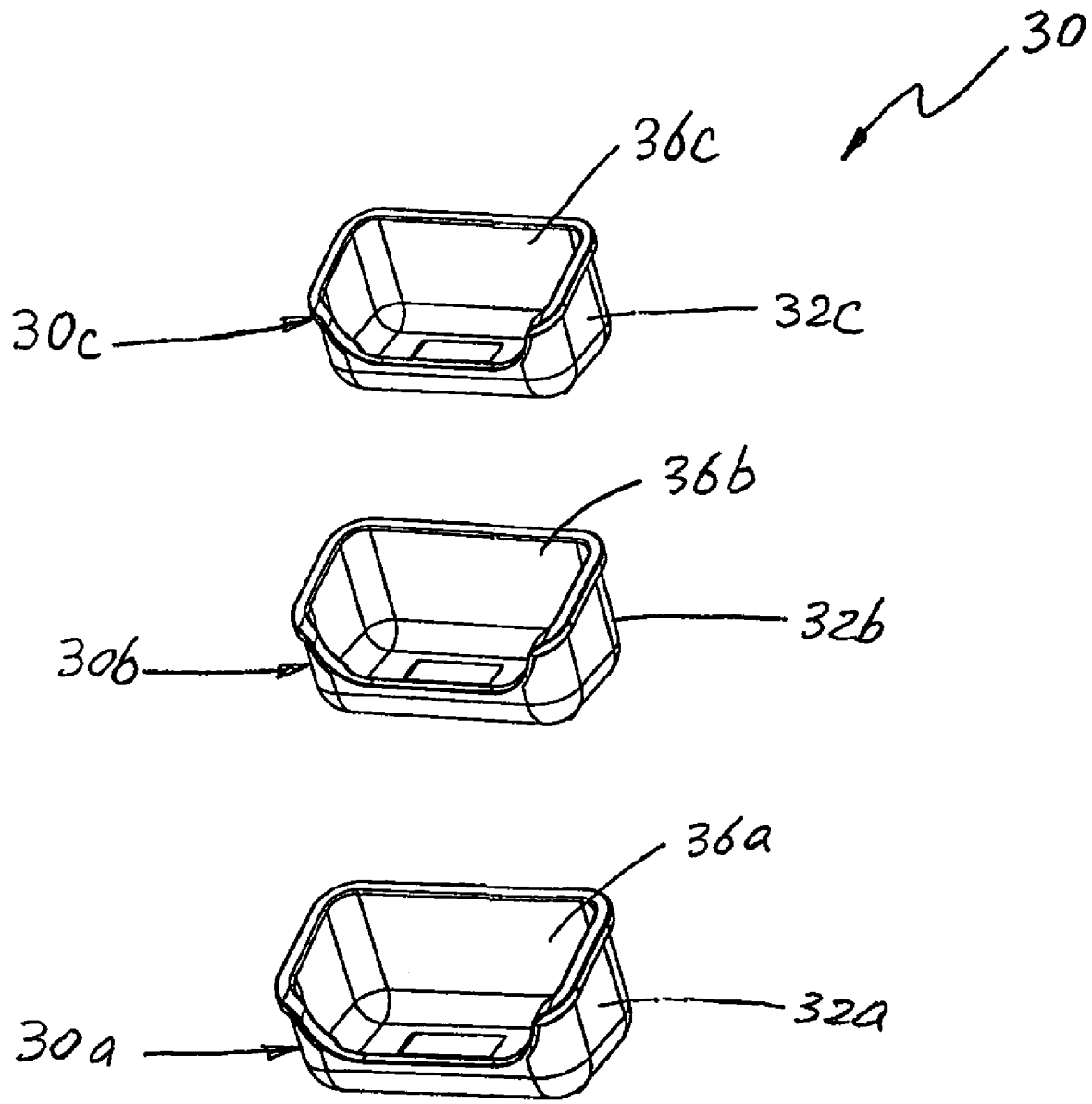
FIG. 5D is a perspective view of an alternative charger adapter.

In an alternative embodiment shown in FIG. 5D, the charger adapter 30' can be formed by a plurality of stackable adapter unit 30a, 30b, 30c. One or more of such stackable adapter unit 30a, 30b, 30c can be used to support the hand held electronic device 2 with one of its protective cover cases 4 of variable thicknesses or without such a protective cover case 4. When none of such stackable adapter unit 30a, 30b, 30c is used with the docking base 10, the docking base 10 can accommodate and support a hand held electronic device 2 combined with its thickest cover case 4.

The outermost adapter unit 30a can have an exterior surface 32a formed to be snuggly fitted inside the reception area 14 of the docking base 10. The interior chamber 36a of the outermost adapter unit 30a can be shaped and sized to snuggly fit the hand held electronic device 2 fitted with a thinner protective cover case 4. When such outermost adapter unit 30a is placed in the reception area 14 and used together with the docking base 10, the combined docking base 10 and outermost adapter unit 30a can accommodate and support a hand held electronic device 2 with a thinner cover case 4.

One or more stackable intermediate adapter unit 30b can be provided between the outermost adapter unit 30a and an innermost adapter unit 30c, which will be described in details below. Each intermediate adapter unit 30b can have an exterior surface 32b formed to be snuggly fit inside an adjacent larger sized adapter unit 30a, 30b. In the example shown FIG. 5D, the intermediate adapter unit 30b is formed to be snuggly fit in the interior chamber 36a of the outermost adapter unit 30a.

Additionally or alternatively, the interior chamber 36b of each intermediate adapter unit 30b is formed to snuggly fit an adjacent smaller sized adapter unit 30b, 30c. In the example shown FIG. 5D, the interior chamber 36b of the intermediate adapter unit 30b is formed to snuggly fit the innermost adapter unit 30c therein. When such intermediate adapter unit 30b is used in addition to the outermost adapter unit 30a and the docking base 10, the combined docking base 10 and adapter units 30a, 30b can support the hand held electronic device 2 with the thinnest cover case 4.

The innermost adapter unit 30c can be formed to be snuggly fit inside the smallest intermediate adapter unit 30b. The interior chamber 36c of the innermost adapter unit 30c can be shaped and sized to accommodate and support the hand held electronic device 2 without any protective cover case 4. When the innermost adapter unit 30c is used together with the one or more intermediate adapter units 30b and the outermost adapter unit 30a, the docking charger 1 can directly support the hand held electronic device 2 after all its protective cover cases 4 are removed.

The charger adapter 30' shown in FIG. 5D is so formed that one or more of the adapter units 30a, 30b, 30c can be interchangeable with the protective cover case 4 to support the hand held electronic device 2 in the docking base 10 during the battery charging operation. For example, the various adapter units 30a, 30b, 30c of the charger adapter 30' can be configured depending on the thickness of the various protective cover cases 4 available to a particular hand held electronic device 2. The adapter units 30a, 30b, 30c so formed can either directly support the hand held electronic device 2 or otherwise be combined to support the combination of the hand held electronic device 2 and a selected protective cover case 4.

On the other hand, when none of such adapter units 30a, 30b, 30c is used with the docking base 10, the docking charger 1 can be used to charge the hand held electronic device 2 together with its thickest protective cover case 4. In such a case, the combined hand held electronic device 2 and thickest protective cover case 4 are directly fitted in the reception area 14. Accordingly, a docking charger 1 using such a charger adapter 30' can charge a hand held electronic device 2 either alone or together with any one of the protective cover cases 4 of different thicknesses.

In the example shown in FIG. 5D, the innermost adapter unit 30c of the charger adapter 30 can be configured to be interchangeable with the thinnest protective cover case 4 during the battery charging operation. For example, when charging the hand held electronic device 2 together with such a thinnest protective cover case 4, the innermost adapter unit 30c is not used. In such a case, the other adapter units 30b, 30c are stacked in the reception area 14 of the docking base 10 to support the combined hand held electronic device 2 and the thinnest protective cover case 4. In an alternative example, when the hand held electronic device 2 is to be charged without such thinnest protective cover case 4, the innermost adapter unit 30c is stacked with the other adapter units 30b, 30c in the reception area 14 to directly support the hand held electronic device 2.

In another example where the hand held electronic device 2 is fitted with a thicker protective cover case 4, both the innermost and intermediate adapter units 30b, 30c are removed from the docking base 10. The outermost adapter unit 30a remains in the reception area 14 to support the combined hand held electronic device 2 together and its thicker protective cover case 4. In a further example, the entire stack of adapter units 30a, 39b, 30c can be formed to be interchangeable with a thickest protective cover case 4 of the hand held electronic device 2 in a similar manner described above in connection with the charger adapter 30.

Figure 6A:
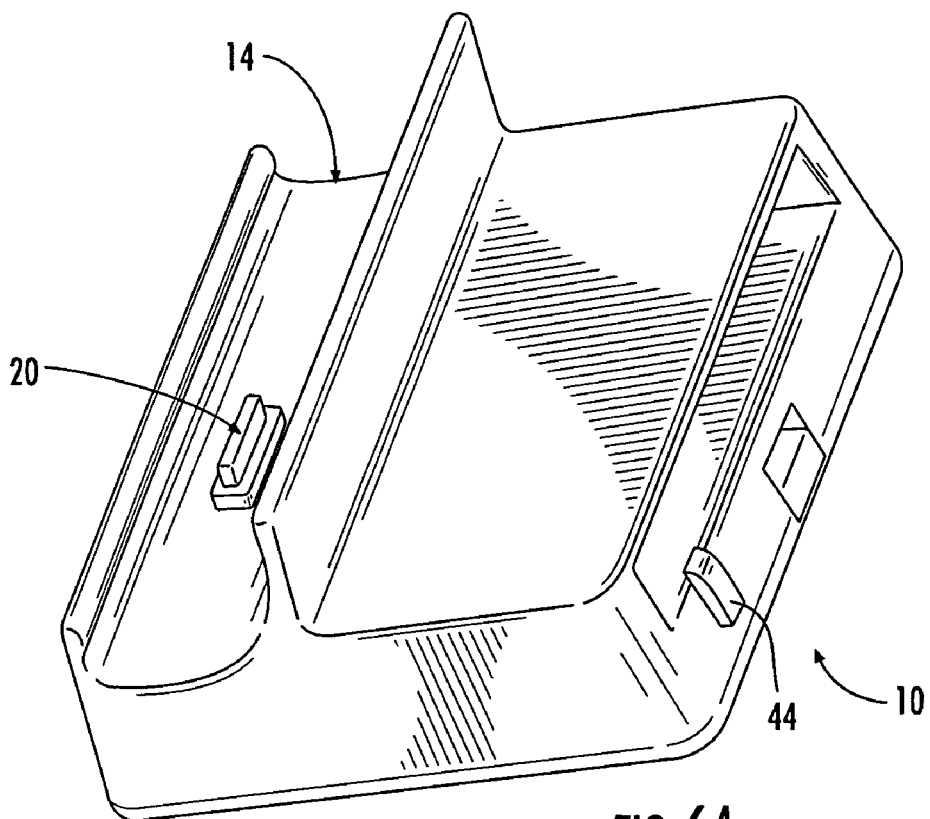
FIGS. 6A to 6C show a docking charger formed according to a third embodiment.
Figure 6B:
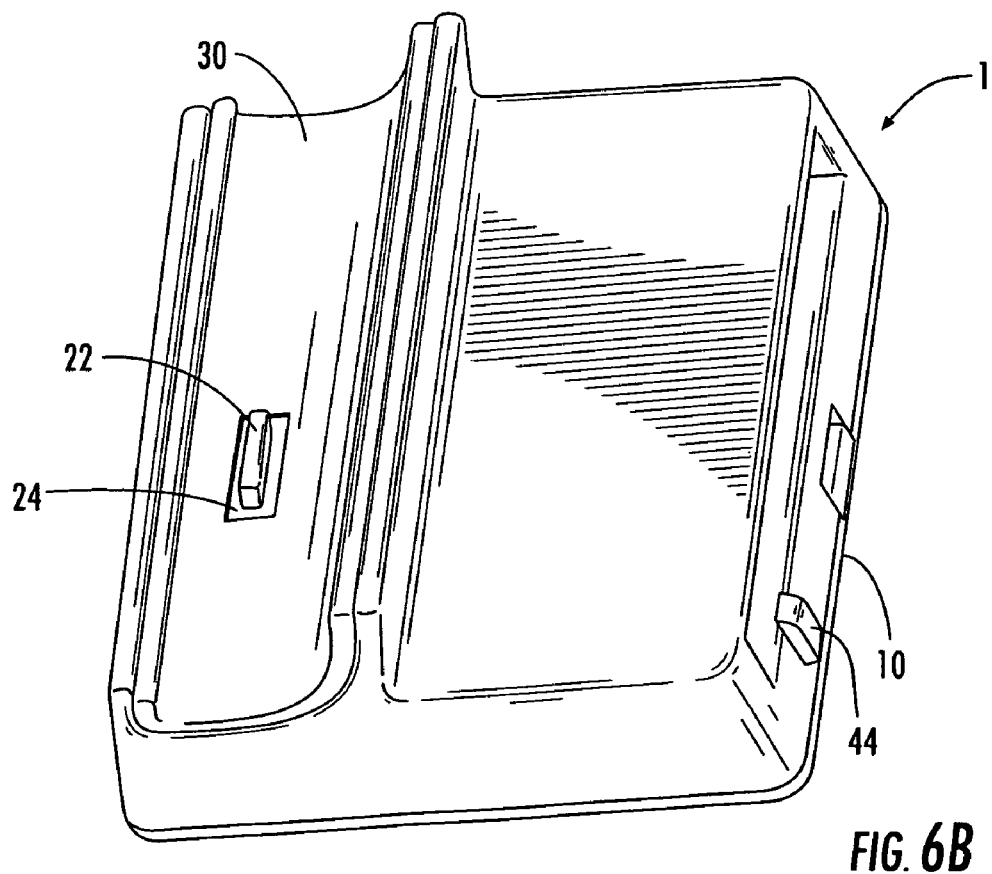
Figure 6C:
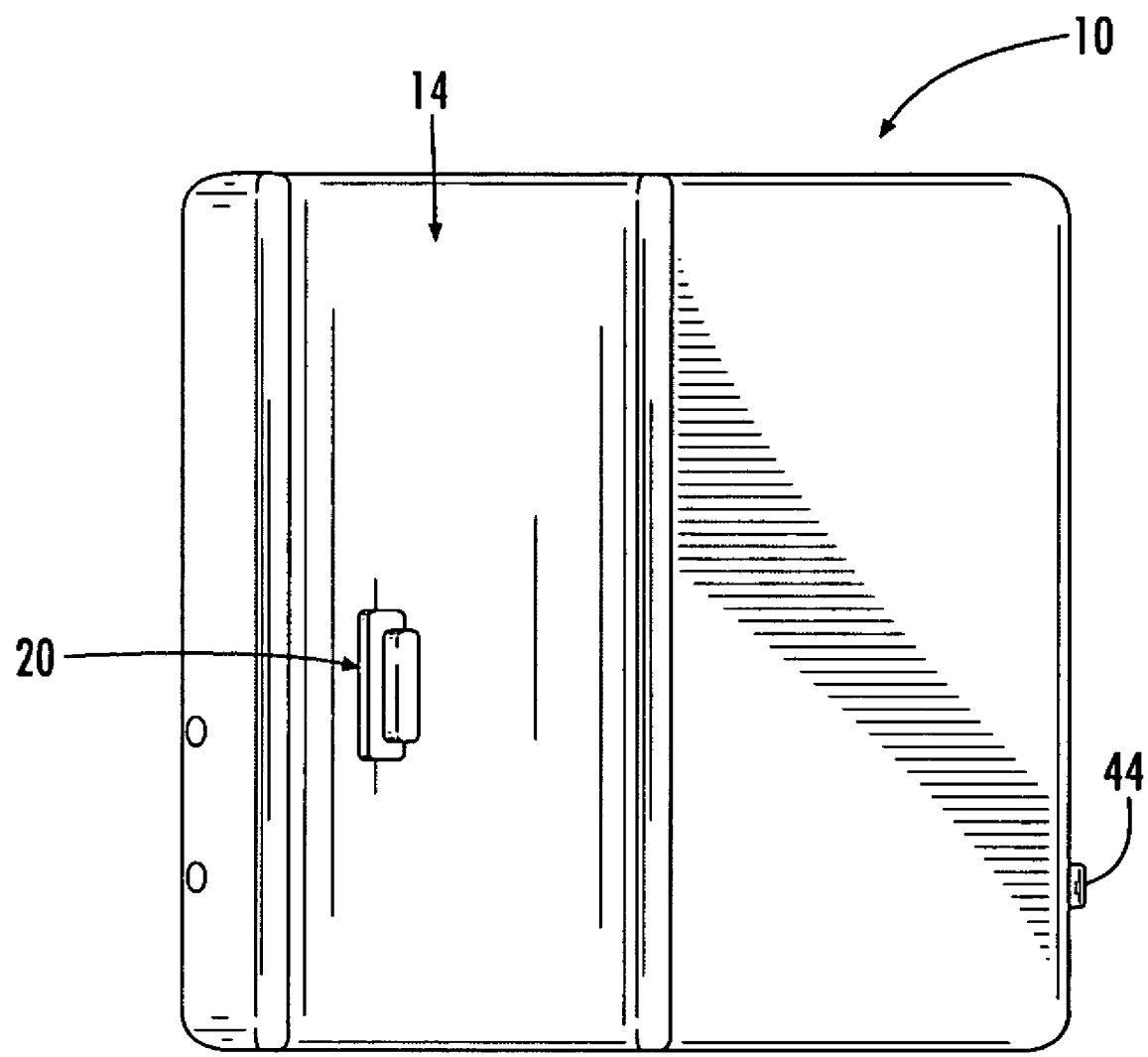

FIGS. 6A to 6C show a third embodiment of the docking charger 1, in which the reception area 14 of the docking base 10 and/or the charger adapter 30 are formed with different configurations. For example, the reception area 14 is formed to support a side portion of a hand held electronic device 2, such as smart phone, fitted with a cover case 4. In one example, the reception area 14 can be defined by the front and rear walls 16f, 16r, without lateral side walls, such as the lateral side walls 16s shown in FIG. 1B. In another example not shown, the reception area 14 can be formed without a front wall, such as the front wall 16f shown in FIG. 1B.

The charger adapter 30 of the docking charger 1 can be similarly formed to be fitted inside the reception area 14. In the example shown in FIG. 6B, the charger adapter 30 can have open lateral sides. In examples not shown, the charger adapter 30 can be formed to have a C-shaped or L-shaped cross section or a plate shape. The charger adapter 30 as well as the reception area 14 of the docking charger 1 can be formed in various other ways to receive the hand held electronic device 2, with or without a protective cover case 4.

Additionally or alternatively, the charging connector 20 can be offset in one or both of the longitudinal and lateral directions of the docking base 10, which is best illustrated in FIG. 6C showing the top down view of the docking base 10.

Figure 7A:
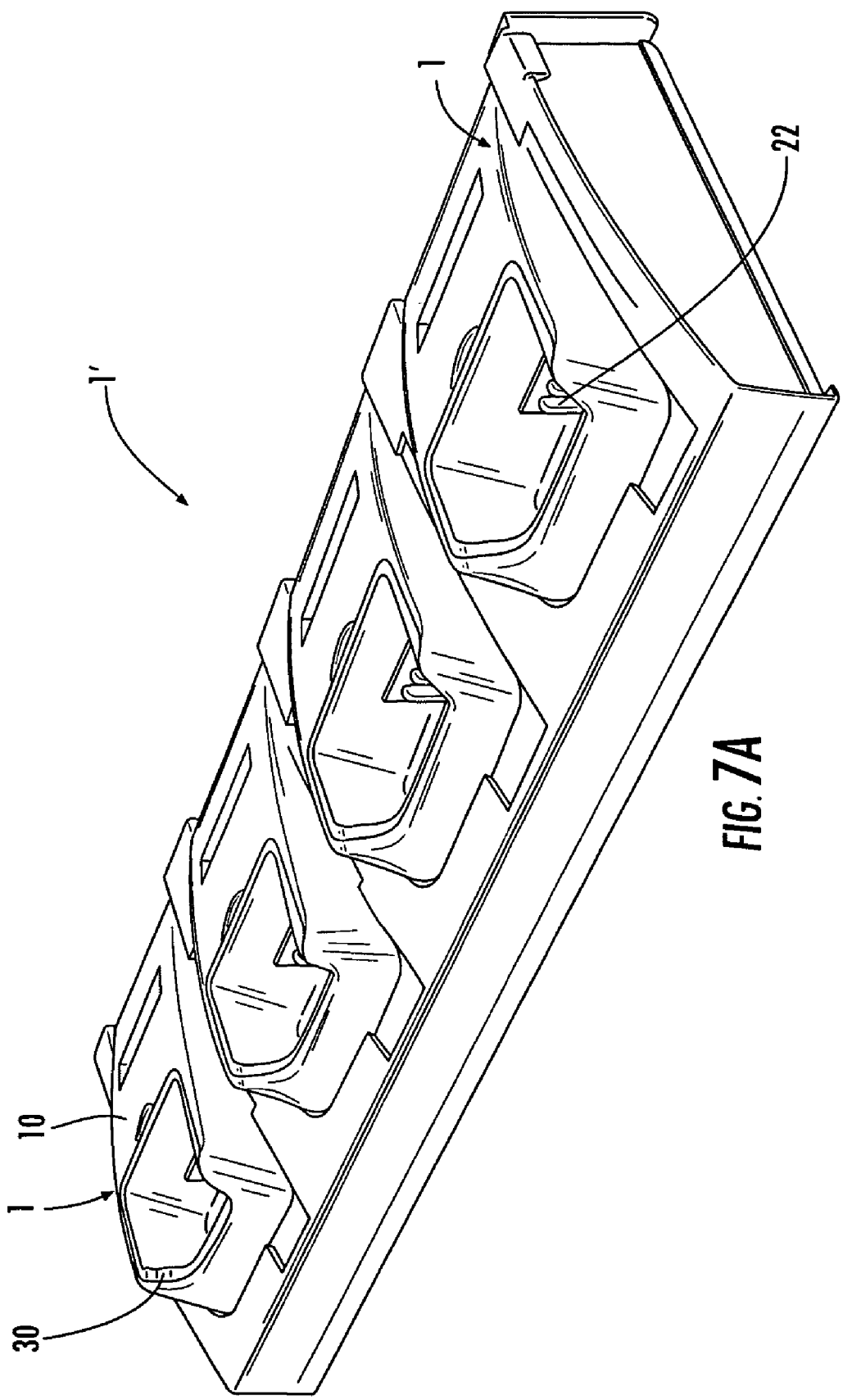
FIGS. 7A and 7B show a docking charger module formed according to a fourth embodiment.
Figure 7B:
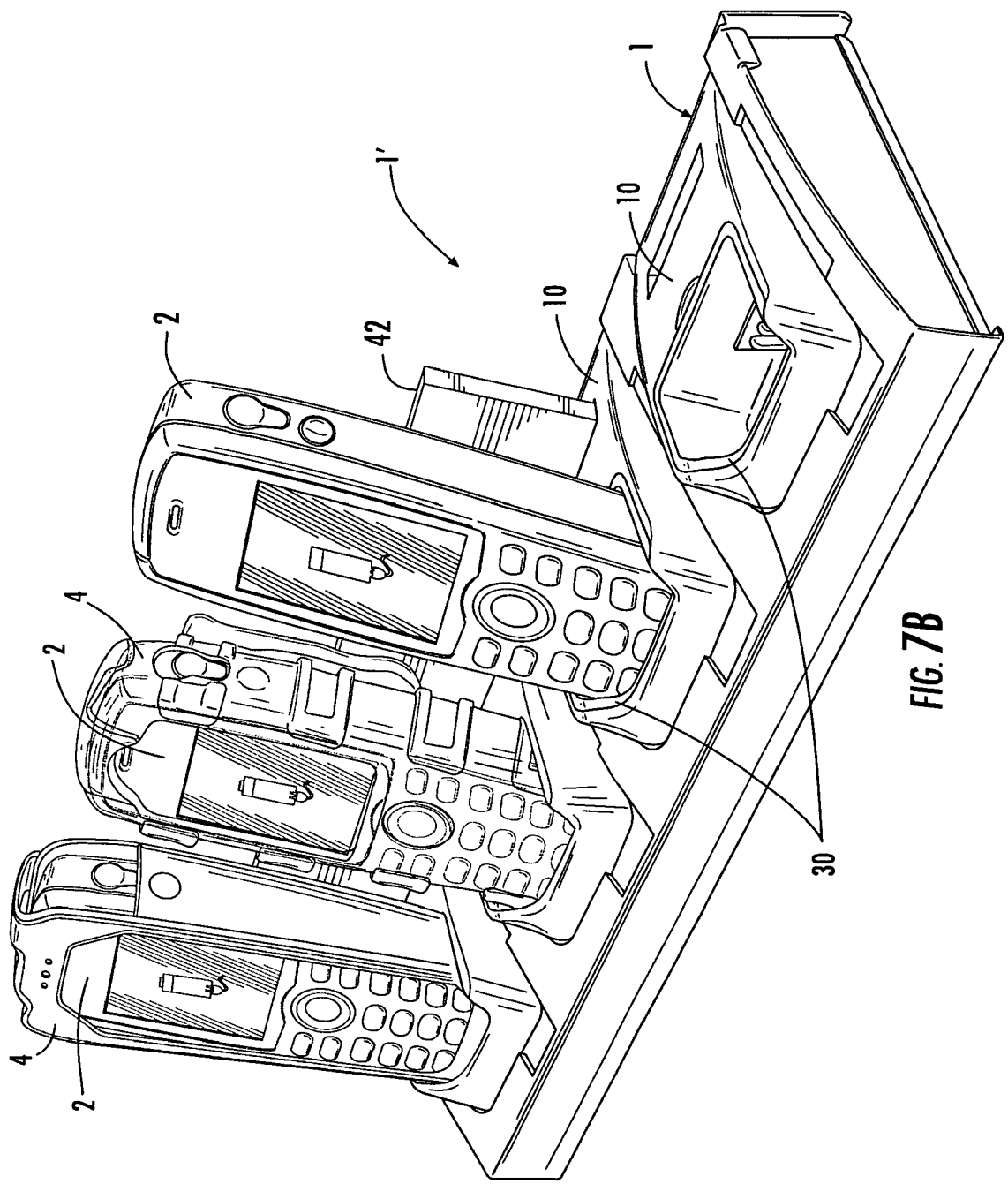

FIGS. 7A and 7B show a fourth embodiment, in which a plurality of docking chargers 1 are jointly formed as a charger module 1'. The docking chargers 1 in the charger module 1' can be formed similarly for charging a plurality of same hand held electronic devices 2 with or without their respective cover cases 4.

In the alternative, the docking chargers 1 in the charger module 1' can be formed differently for charging different types of hand held electronic devices 2 or the same type of hand held electronic devices 2 with different types of protective cover cases 4. In one example, the reception areas 14 of the various docking bases 10 can be formed to have different shapes and/or sizes to receive the same type of hand held electronic devices 2 with different types cover cases 4. In another example, the interior chambers 36 of the charger adapters 30 can be formed to have different shapes and/or sizes to directly receive hand held electronic devices 2 of different shapes and/or sizes.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A docking charger for charging a hand held electronic device, which is used with a protective cover case during normal use of the hand held electronic device, the docking charger comprising:
   a docking base adapted for connecting to a power source and formed with a reception area, the reception area having a shape and size to support and hold the hand held electronic device in a charging position when the protective cover case is fitted on the hand held electronic device; and
   a charger adapter formed to be removably fitted in the reception area of the docking base, the charger adapter having an interior chamber shaped and sized to directly receive and support and hold the hand held electronic device in the charging position when the protective cover case is removed from the hand held electronic device;
   wherein the docking charger has a first working position where at least part of the charger adapter is removed from the reception area of the docking base to receive the hand held electronic device fitted with its protective cover case; and
   wherein the docking charger has a second working position where the charger adapter is fitted inside the reception area of the docking base to directly receive the hand held electronic device free of its protective cover case.

2. The docking charger of claim 1, wherein the docking base comprises a charging connector formed on a portion of a surrounding wall of the reception area and extending inside the reception area, the charging connector comprising a contact portion adapted to electrically contact a charging port of the hand held electronic device when the hand held electronic device is in the charging position.

3. The charger adapter of claim 2, wherein the charging connector further comprises a base portion extending from the portion of the surrounding wall and the contact portion is formed on the base portion.

4. The docking charger of claim 3, wherein the base portion has a height measured from the portion of the surrounding wall, said height being substantially the same as a thickness of the protective cover case.

5. The docking charger of claim 4, wherein the charger adapter has a rear wall with a thickness substantially the same as the height of the base portion of the charging connector.

6. The docking charger of claim 3, wherein the base portion is partially in contact with the protective cover case in the first working position, and wherein the base portion is partially in contact with the charger adapter in the second working position.

7. The docking charger of claim 1, wherein the charger adapter at least partially contacts the base portion of the charging connector in the second working position.

8. The docking charger of claim 1, wherein the charger adapter has a cup shape formed by a surrounding wall having a thickness substantially the same as a thickness of the protective cover case.

9. The charger adapter of claim 1, wherein the charger adapter comprises a plurality of stackable adapter units compatible with a respective plurality of different protective cover cases.

10. The docking charger of claim 1, wherein the charger adapter is formed with an access opening for passing a contact portion to electrically connect the hand held electronic device with the docking base at the second working position, whereby the charger adapter is formed without an electrical contact.

11. An accessory kit being used with a docking base during a battery charging operation for a hand held electronic device, the accessory kit comprising:
    a protective cover case adapted to be fitted onto the hand held electronic device and having a portion shaped and sized for receipt in a reception area in the docking base along with the hand held electronic device; and
    a charger adapter configured to directly support and hold a portion of the hand held electronic device in the reception area in the docking base;
    wherein the accessory kit has a first working position where at least part of the charger adapter is removed to receive the hand held electronic device fitted with its protective cover case in the reception area of the docking base; and
    wherein the accessory kit has a second working position where the charger adapter is used to directly support the hand held electronic device free of its protective cover case in the reception area of the docking base.

12. The accessory kit of claim 11, wherein the charger adapter and a lower portion of the protective cover case are formed to have a substantially same thickness.

13. The accessory kit of claim 11, wherein the protective cover case and the charger adapter are formed with access openings for accommodating a charging connector on the docking base, and wherein the access openings are formed to have substantially the same size.

14. The accessory kit of claim 11 further comprising a docking base adapted for connecting to a power source and formed with a reception area, the reception area being configured to accommodate a portion of the hand held electronic device together with the protective cover case fitted on the hand held electronic device.

15. The accessory kit of claim 14, wherein the charger adapter comprises a surrounding wall defining an exterior surface and an interior chamber, the interior chamber of the charger adapter being configured to directly receive a portion of the hand held electronic device without a protective cover case; and the exterior surface of the charger adapter being configured to be fit inside the reception area of the docking base.

16. The accessory kit of claim 15, wherein the docking base comprises a charging connector formed on a portion of a surrounding wall of the reception area, the charging connector comprising a base portion raised from the portion of the surrounding wall for a height, and wherein the protective cover case and the charger adapter each have a thickness substantially the same as the height of the base portion.

17. The accessory kit of claim 11 comprising a plurality of protective cover cases having different thickness, wherein the charger adapter comprises a plurality of stackable adapter units, at least one of the stackable adapter units having an interior chamber shaped and sized to directly receive a portion of the hand held electronic device fitted with one of the plurality of protective cover case with a smaller exterior size.

18. The docking charger of claim 11, wherein the protective cover case is formed with an access opening for passing a contact portion to electrically connect the hand held electronic device with the docking base when the protective cover case is used in the docking base, whereby the protective cover case is formed without an electrical contact.

19. The docking charger of claim 11, wherein the charger adapter is formed with an access opening for passing a contact portion to electrically connect the hand held electronic device with the docking base when the charger adapter is used in the docking base, whereby the charger adapter is formed without an electrical contact.

20. A charger adapter for use with a hand held electronic device during a battery charging operation, the charger adapter comprising a surrounding wall defining an exterior surface and an interior chamber,
  wherein the interior chamber of the charger adapter is configured to directly receive a portion of the hand held electronic device without a protective cover case; and
  wherein the exterior surface of the charger adapter is configured for receipt in a reception area in a docking base and to be supported thereby;
  wherein the charger adapter has a first working position where at least part of the charger adapter is removed to receive the hand held electronic device fitted with its protective cover case in the reception area of the docking base; and
  wherein the charger adapter has a second working position where the charger adapter is used to directly receive the hand held electronic device free of its protective cover case in the reception area of the docking base.

21. The docking charger of claim 20, wherein the charger adapter is formed with an access opening for passing a contact portion to electrically connect the hand held electronic device with the docking base when the charger adapter is used in the docking base, whereby the charger adapter is formed without an electrical contact.

22. An accessory kit for a hand held electronic device, the accessory kit comprising:
  a protective cover case adapted to be fitted onto the hand held electronic device during the normal use of the hand held electronic device; and
  a docking base adapted for connecting to a power source and formed with a reception area having at least two working positions, wherein a first working position configured to accommodate a portion of the hand held electronic device together with the protective cover case fitted on the hand held electronic device and a second working position configured to accommodate a portion of the handheld without the protective case;
  wherein the protective cover case has a portion shaped and sized to be supported by the reception area in the docking base, when the protective cover case is fitted onto the hand held electronic device and is received in the first working position in the docking base.

23. The accessory kit of claim 22,
  wherein the docking base comprises a charging connector formed on a portion of a surrounding wall of the reception area, the charging connector comprising a base portion raised from the portion of the surrounding wall for a height, and
  wherein the protective cover case has a thickness substantially the same as the height of the base portion of the charging connector.

24. The accessory kit of claim 23 comprising a plurality of protective cover cases adapted to be fitted onto different hand held electronic devices,
  wherein the plurality of protective cover cases each have a portion shaped and sized to be supported by the reception area in the docking base, when the protective cover case is fitted onto the hand held electronic device and is received in the reception area in the docking base.

25. The docking charger of claim 22, wherein the protective cover case is formed with an access opening for passing a contact portion to electrically connect the hand held electronic device with the docking base when the protective cover case is used in the docking base, whereby the protective cover case is formed without an electrical contact.

26. A charger adapter for use with a hand held electronic device during a battery charging and/or data transferring operation, the charger adapter comprising a first adapter unit having a surrounding wall defining an exterior surface and an interior chamber;
  wherein the exterior surface of the first adapter unit is configured for receipt in a reception area of a docking base and to be supported thereby; and
  wherein the interior chamber of the first adapter unit is configured to receive a portion of the hand held electronic device and a first protective case fitted on the hand held electronic device, thereby supporting and holding the hand held electronic device and the first protective case in the reception area of the docking base;
  wherein the charger adapter has a first working position where the first adapter unit is used to receive the hand held electronic device fitted with the first protective case in the reception area of the docking base;
  wherein the charger adapter has a second working position where at least part of the first adapter unit is removed to receive the hand held electronic device fitted with a second protective case in the reception area of the docking base; and
  wherein the first and second protective cases have different thicknesses.

27. The charger adapter of claim 26, wherein the first adapter unit comprises a plurality of stackable sub-units each having an interior chamber configured to receive the portion of the hand held electronic device fitted with protective cases of different thickness, whereby the plurality of the stackable sub-units are capable of supporting and holding the hand held electronic device fitted with the respective protective cases of different thicknesses in the reception area of the docking base.

28. The charger adapter of claim 26 further comprising a second adapter unit, the second adapter unit having a surrounding wall defining an exterior surface and an interior chamber;
  wherein the exterior surface of the second adapter unit is configured for receipt in a reception area of a docking base and to be supported thereby;
  wherein the second adapter unit has an interior chamber configured to directly receive the portion of the hand held electronic device without a protective case, thereby directly supporting and holding the hand held electronic device without a protective case in the reception area of the docking base.

29. The docking charger of claim 26, wherein the first adapter unit is formed with an access opening for passing a contact portion to electrically connect the hand held electronic device with the docking base when the first adapter unit is used in the docking base, whereby the first adapter unit is formed without an electrical contact.

30. The docking charger of claim 28, wherein the second adapter unit is formed with an access opening for passing a contact portion to electrically connect the hand held electronic device with the docking base when the second adapter unit is used in the docking base, whereby the second adapter unit is formed without an electrical contact.

31. A charger adapter kit for use with a hand held electronic device during a battery charging and/or data transferring operation, the charger adapter kit comprising a plurality of first charger adapters each comprising a surrounding wall defining an exterior surface and an internal chamber, wherein the exterior surface of each of the plurality of first charger adapters is configured for receipt in a reception area of a docking base and to be supported thereby;

wherein the interior chambers of the plurality of first charger adapters are configured to receive a portion of the hand held electronic device fitted with respective protective cases of different thicknesses, whereby each of the plurality of first charger adapters is capable of supporting and holding the hand held electronic device fitted with a respective protective case in the reception area of the docking base;

wherein the charger adapter kit has a first working position where a first of the plurality of first charger adapters is used to receive the hand held electronic device fitted with a protective case of a first thickness in the reception area of the docking base and; and wherein the charger adapter kit has a second working position where a second of the plurality of first charger adapters is used to receive the hand held electronic device fitted with a protective case of a second different thickness in the reception area of the docking base.

32. The charger adapter kit of claim 31 further comprising a second charger adapter, which comprises a surrounding wall defining an exterior surface and an internal chamber, wherein the exterior surface of the second charger adapter is configured for receipt in the reception area of the docking base and to be supported thereby; and wherein the interior chamber of the second charger adapter unit is configured to directly receive the portion of the hand held electronic device without a protective case, thereby directly supporting and holding the hand held electronic device without a protective case in the reception area of the docking base.

33. The docking charger of claim 31, wherein each of the plurality of first charger adapters is formed with an access opening for passing a contact portion to electrically connect the hand held electronic device with the docking base when the first charger adapter is used in the docking base, whereby the plurality of first charger adapters are formed without an electrical contact.

34. The docking charger of claim 32, wherein the second charger adapter is formed with an access opening for passing a contact portion to electrically connect the hand held electronic device with the docking base when the second charger adapter is used in the docking base, whereby the second charger adapter is formed without an electrical contact.

* * * * *